Oct. 17, 1967　　　A. P. STROM　　　3,347,415
METERING DISPENSER DEVICES FOR FLUIDS
Filed Oct. 18, 1965　　　5 Sheets-Sheet 2

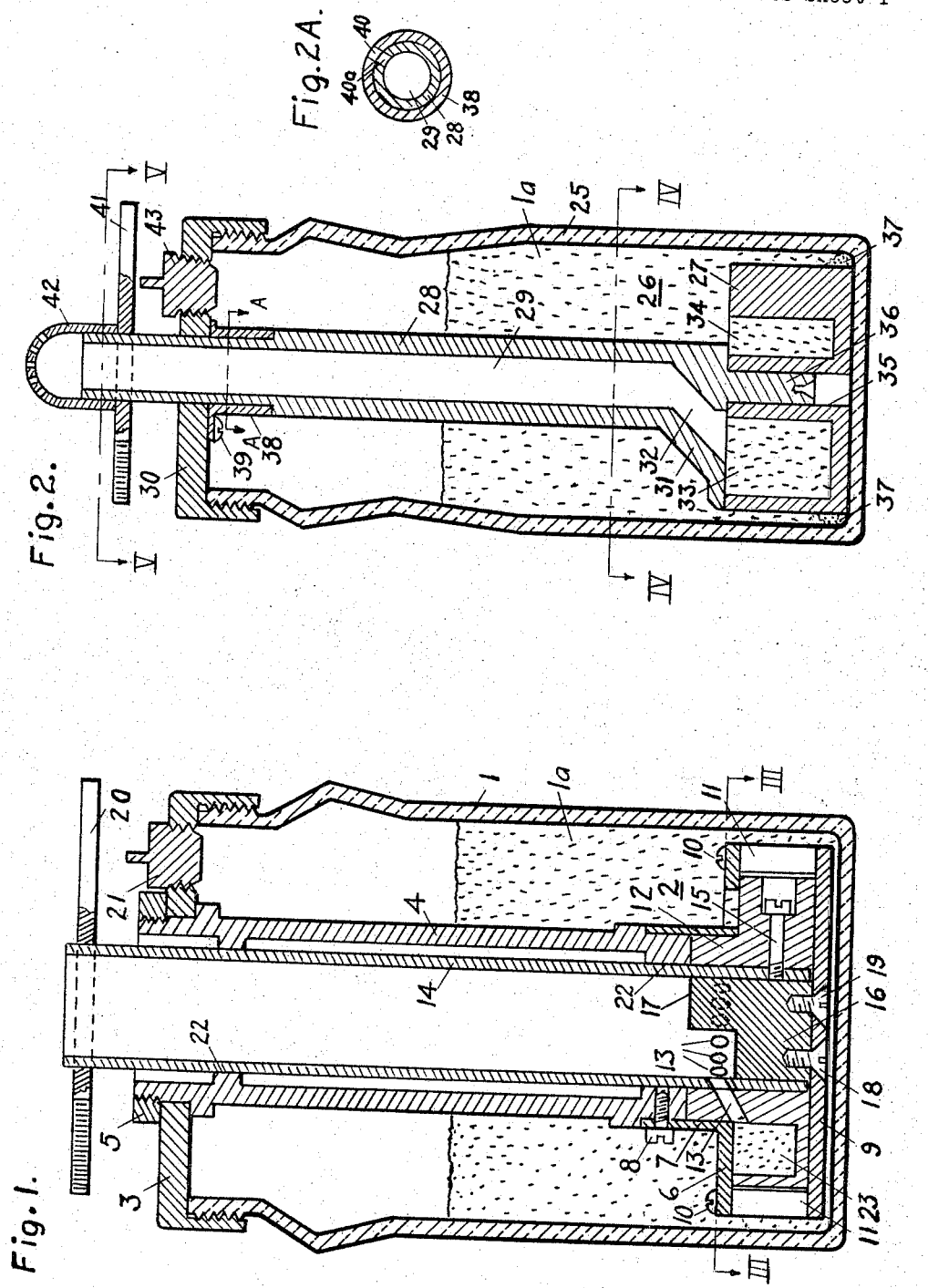

INVENTOR.
ALBERT P. STROM
BY
Willard R. Crout
ATTORNEY

Oct. 17, 1967    A. P. STROM    3,347,415
METERING DISPENSER DEVICES FOR FLUIDS
Filed Oct. 18, 1965    5 Sheets-Sheet 3
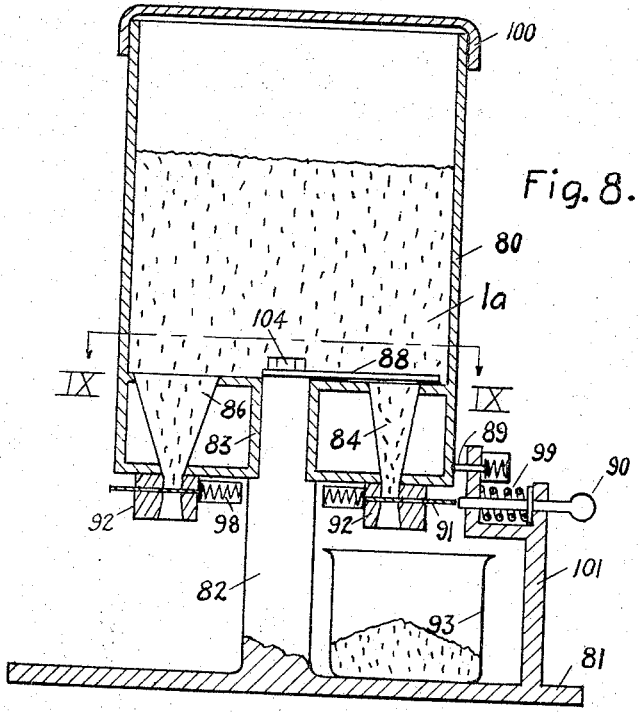
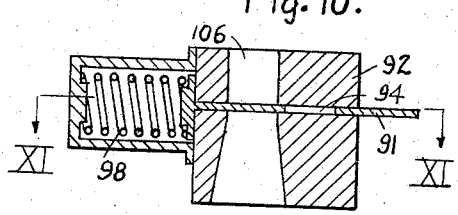
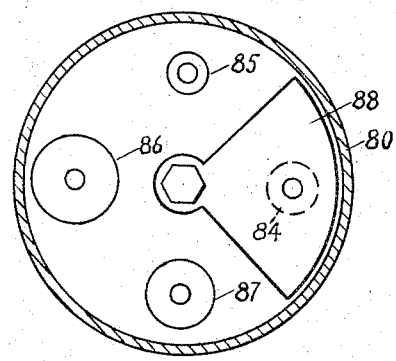
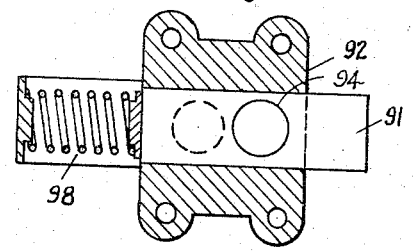
INVENTOR.
ALBERT P. STROM
BY
*Willard R. Crout*
ATTORNEY Oct. 17, 1967
A. P. STROM
3,347,415
METERING DISPENSER DEVICES FOR FLUIDS
Filed Oct. 18, 1965
5 Sheets-Sheet 4
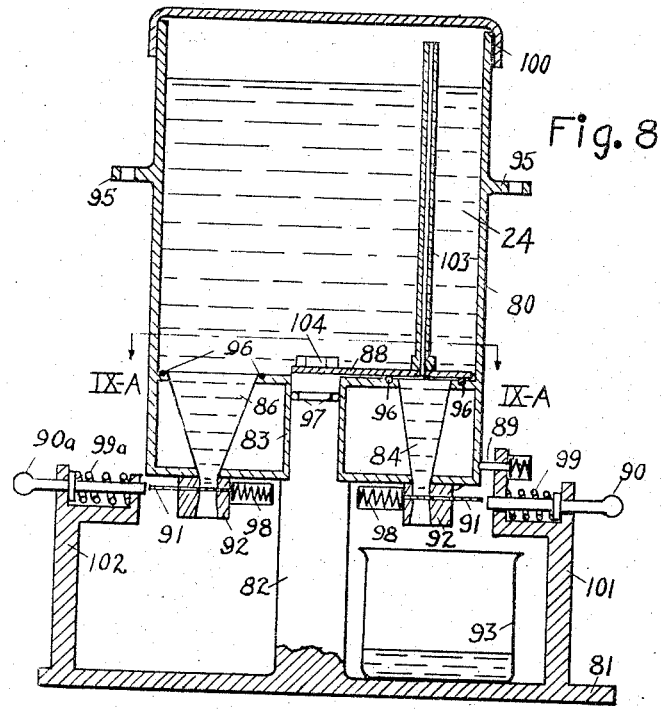
Fig. 8A.
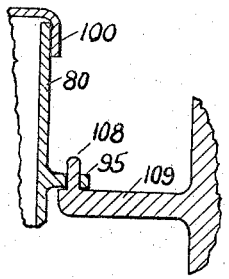
Fig. 8B.
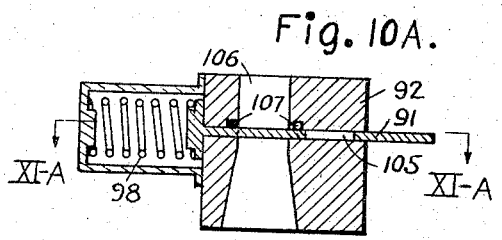
Fig. 10A.
Fig. 9A.
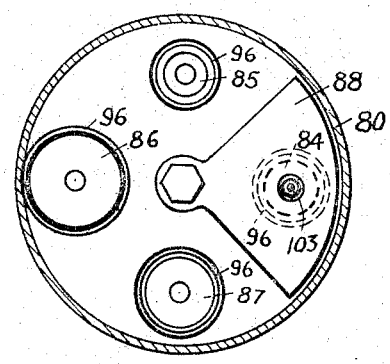
Fig. 11A.
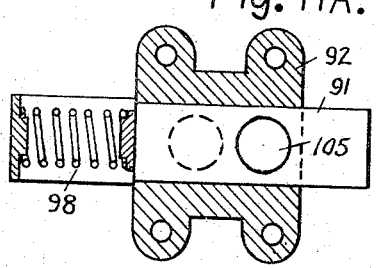
INVENTOR.
ALBERT P. STROM
BY
Willard R. Crout
ATTORNEY Oct. 17, 1967  A. P. STROM  3,347,415
METERING DISPENSER DEVICES FOR FLUIDS
Filed Oct. 18, 1965  5 Sheets-Sheet 5

INVENTOR.
ALBERT P. STROM
BY
Willard R. Croit
ATTORNEY

United States Patent Office 3,347,415
Patented Oct. 17, 1967

3,347,415
METERING DISPENSER DEVICES FOR FLUIDS
Albert P. Strom, Forest Hills, Pa. (222 Castlegate Road, Forest Hills Borough, Pittsburgh, Pa. 15221)
Filed Oct. 18, 1965, Ser. No. 497,011
9 Claims. (Cl. 222—48)

This invention relates, generally, to metering dispenser devices, and more particularly to improved metering dispenser devices for dispensing fluids such as powdered or granular solid materials or even liquids. Most of these devices are primarily designed for dispensing relative small quantities of fluid materials. Others, using principles of my invention may be used for dispensing materials in relatively large units. The term "fluid" as employed herein, comprises solid granular material, a powder or even liquids.

The measurement of definite quantities of various materials is frequently necessary. For special applications, such as in manufacturing, where a great number of measurements are made, suitable metering or weighing devices are available, but these are generally complicated and expensive and not applicable to measuring and dispensing small quantities of material in the home, office or shop. Consequently, in these places, most materials are still measured by relatively crude methods, such as by the teaspoonful or cupful. This is not only time consuming, but moreover unless painstakingly done, is often quite inaccurate.

It is therefore a general object of this invention to provide simple and inexpensive dispensers that can be used to accurately measure and dispense various materials.

A further object of this invention is to provide dispensers which measure these materials more accurately than can readily be done with presently-used devices.

Another object is to provide a device that is more convenient to use than older-type measuring devices.

Another object is to prevent waste of materials.

Still another object is to provide dispensers that save the user time and labor.

Further objects of the invention will be obvious from a reading of the specification.

For a better understanding of this invention, reference may be made to the following detailed description and drawings, in which:

FIGURE 1 is a vertical cross-sectional view taken through one embodiment of this invention, the view being taken along the lines I—I of FIG. 3;

FIG. 2 is a vertical cross-sectional view of a second embodiment of this invention, the view being taken along lines II—II of FIG. 4;

FIG. 2A is a fragmentary horizontal section of FIG. 2 taken along the line A—A;

FIG. 8 shows a vertical section of an embodiment of this invention suitable for dispensing relatively large quantities;

FIG. 8A is a vertical section of an embodiment of this invention which is an adaptation of the device shown in FIG. 8, making it suitable for dispensing liquids;

FIG. 8B is a fragmentary section of a dispenser essentially similar to FIGS. 8 and 8A that illustrates a method of construction in which the material container is suspended in a stationary position and in which the dispenser mechanism rotates about the container;

FIG. 9 is a horizontal section of the device in FIG. 8, along line IX—IX;

FIG. 9A is a horizontal section of the device in FIG. 8A along the lines IXA—IXA;

FIG. 10 is a fragmentary enlarged view of the discharge valve of FIG. 8;

FIG. 10A is an enlarged view of the discharge valve shown in FIG. 8A;

FIG. 11 is a horizontal section of the valve in FIG. 10, taken along line XI—XI;

FIG. 11A is a horizontal section of the valve in FIG. 10A, taken along line XIA—XIA;

Figure 3:
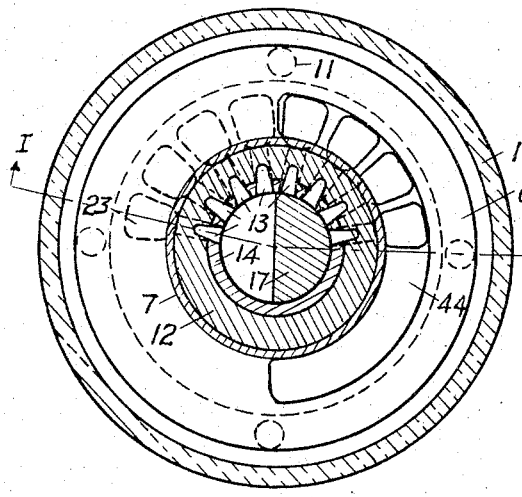
FIG. 3 is a sectional view, taken through the device of FIG. 1, the view being taken substantially along line III—III of FIG. 1.

Referring to FIG. 1 of the drawings, the reference numeral 1 designates a container which may be of any suitable material, such as glass, metal or plastic. The container 1 houses the material 1a to be dispensed, as well as a dispensing mechanism, which is generally designated by the reference numeral 2. The container 1 is closed by a cap 3, to which mechanism 2 is attached by means of tube 4 and nut 5. A circular plate 6, integrally connected to a cylindrical section thereof 7, is attached to the lower end of tube 4 by suitable means, as for example, screw 8. Another circular plate 9 is attached parallel to, and below plate 6, by suitable means, such as screws 10 and spacers 11.

Between plates 6 and 9 is a rotatable metering cylinder or section 12, which is free to rotate about its vertical axis, between plates 6 and 9. A rotatable tube 14, fits closely through the axis of metering cylinder 12 and is attached to it, as by screw 15. Tube 14 is closed at its lower end by a stationary cylindrical plug 16, which is attached by screws 18, 19 to plate 9. Plug 16 forms an axis or hub, about which tube 14 and cylinder 12 may rotate. Tube 14 extends at its upper end through cap 3, and has attached to it a lever or indicator 20 to facilitate its rotation, together with cylinder 12, about the vertical axis. The bearings 22 in supporting tube 4 guide the tube 14 as it rotates, turning metering cylinder 12 with it.

In metering cylinder 12 are located several (in this particular instance eight) metering cavities 23. The location of these may be more clearly seen by reference to FIG. 3. From each of these cavities, a passage, such as 13, leads from the top of the cavity to the interior of tube 14.

Referring now to FIG. 3, it may be seen that the eight cavities 23 occupy approximately 180 degrees of the circumference of metering cylinder 12. It may be observed also that the plate 6 has a cutout portion 44 extending approximately 180 degrees around its periphery. Referring to FIGS. 1 and 3, it may be seen that plug 16 has a raised portion 17 extending 180 degrees around its periphery. The raised portion 17 of plug 16 is so located that it closes the passages 13 of the metering cavities 23 which are opposite the cutout portion of plate 6, but leaves the passages 13 open to tube 14, on those metering cavities 23, that are covered by the solid portion of plate 6.

When the dispenser is inverted, those metering cavities 23 covered by the solid portion of plate 6, will be emptied into tube 14, and can be poured out of its upper end, but those cavities 23 which are opposite the open section of plate 6 cannot empty into tube 14. Thus, by turning the tube or selecting means 14 and metering cylinder 12, the contents of any desired number of the cavities 23 may be dispensed at will.

A dispensing or measuring dial on the outer side surface of cap 3, indicates the position to which selective measuring lever 20 must be turned to dispense any desired volume. To reset the dispenser, it is necessary only to move the lever 20 back to zero. All the cavities 23 will refill by gravity as each passes under the cutout portion 44 of plate 6. A filling hole closed by a plug 21 is provided in cap 3.

The embodiment of this invention shown in FIGS. 1 and 3, lends itself to a construction in which each metering cavity 23 is of equal volume, as for example ⅛ teaspoonful, or 1 milliliter, etc. Thus, with a single setting of the lever 20 any desired fraction of the total volume of all the cavities can be dispensed. It is, however, not necessary that each of cavities 23, should have the same volume.

Although the stationary part of mechanism 2 in FIG. 1 is shown attached to the cover 3, it may in some cases be more convenient to attach this stationary portion to the bottom of container 1. This would eliminate the supporting tube 4, and thus simplify the dispenser. This type of construction is illustrated in a slightly different embodiment of this invention, which is shown in FIG. 2.

In the embodiment of the invention shown in FIG. 2, the reference numeral 25 designates a container, which may be of any suitable material. As in FIG. 1, this container 25 houses the material 1a to be dispensed as well as the dispensing mechanism, which is here generally designated by the reference numeral 26. The metering cylinder or measuring block 27, which contains the metering cavities 33, 34, 45 and 46 (see also FIG. 4) is in this case stationary, and is held to the bottom of the container 25, by any suitable means, as for example, an adhesive cement 37. However, the metering element or measuring block 27 may actually be moulded into container 25 as an integral part thereof.

Container 25 is closed at its upper end by cap 30. A rotatable tubular member 28, extends through cap 30, its upper end terminating with a perforated cap 42. There is also a lever 41, attached to tube 28, to facilitate its rotation, and to indicate the proper dispensing position for dispensing various quantities of the dispensing material 1a. The lower end of selector flow tube 28 terminates in a cylindrical section 36, which fits into the bearing hole 35, at the center of metering cylinder 27. The dispensing flow member 28, also has a sector-shaped extension 31 at its lower end. From the under side of 31, which fits closely with the upper surface of metering cylinder 27, a diagonal hole 32 connects to the hollow portion 29 of tube 28. As the member 28 is rotated to a position in which opening 32 registers with one of the metering cavities (such as 33) its contents 1a can be poured into tube 29, and out from its perforated cap 42.

Figure 4:
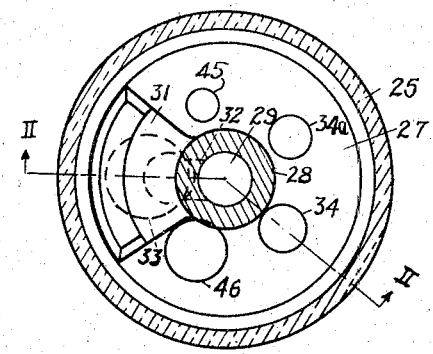
FIG. 4 is a cross-sectional view of FIG. 2, taken along the line IV—IV of FIG. 2.

Referring to FIG. 4, it may be seen that four metering cavities of different sizes (which might be, for example, 1, ½, ¼ and ⅛ teaspoonful) are shown. Any one of these volumes may be poured by simply moving sector 31 over it and inverting the dispenser. As the sector is moved away, the metering cavity immediately refills by gravity from the general interior of container 25, and is ready to be used again.

Referring again to FIG. 4, it will be noted that there is an additional position between cavities 34 and 45. In this position, there is an extra cavity, indicated by numeral 34a. When the sector 31 covers this position, hole 40 in sleeve 38 comes into alignment with hole 40a in the tube 28, as shown in FIG. 2A. This is a "continuous pour" position. Sleeve 38, which also serves as the upper bearing of tube 28, is rigidly attached to cap 30 by some suitable means, such as screws 39, or for certain applications, it may be an integral part of cap 30. Now, if the dispenser is inverted, the material 1a in cavity 34a, will first be discharged, and additional material will continue to pour through holes 40–40a into tube 28 and out of perforated cap 42. When the dispenser is again brought to an upright position at the end of pouring operation, there may be a small amount of material left in tube 29, which will fall to the bottom of the tube 29. However, since cavity 34a is lined up with tube 29, any residue will fall into cavity 34a. Hence, when sector 31 is moved to discharge one of the metered cavities, none of this residue is carried along. The residue is usually small, but if the next metered cavity is also small, such as for example ⅛ teaspoonful, an appreciable error would result if cavity 34a were not present. A filling hole closed by plug 43 is provided in cap 30.

Figure 5:
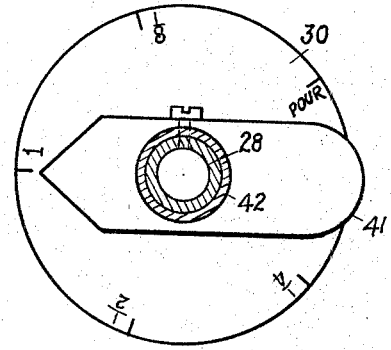
FIG. 5 is a top sectional plan view of the measuring device of FIG. 2 taken along the line V—V thereof.

FIG. 5 is a top sectional plan view of FIG. 2 taken along lines V—V of FIG. 2. It shows the dial markings on the upper side of cap 30, which indicate the possible settings of lever 41, at which the volumes contained in any one of cavities 33, 46, 34, or 45 may be poured. In this example, these volumes are respectively 1, ½, ¼ and ⅛ teaspoonful. It is obvious that any desired volume units may be used. The continuous pour setting is also indicated on this outer surface dial.

Figure 6:
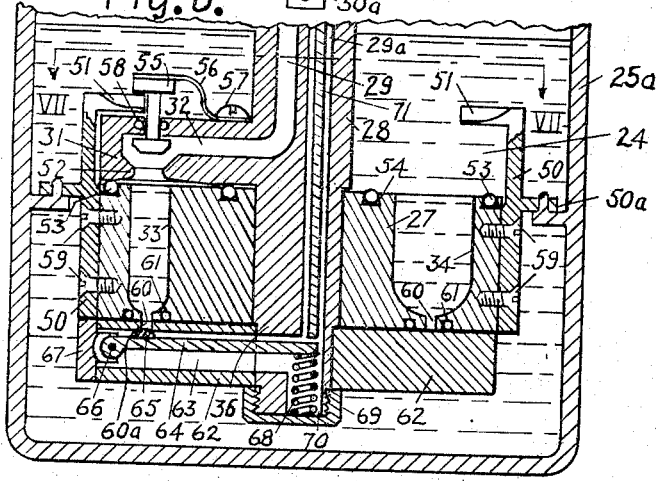
FIG. 6 shows a dispensing mechanism similar to that of FIG. 2, but adapted for dispensing liquids rather than solids, the view being taken on the line VI—VI of FIG. 7.

FIG. 6 shows a variation of the dispensing mechanism 26 of FIG. 2, which adapts it for use in dispensing liquids 24. As in FIG. 2, there is a metering or measuring block 27, which is held in a stationary position in a metallic dispenser chamber 25a by any suitable means, such as by lugs 50a constituting a part of camming support brackets 50. There is also a rotatable selector sector 31 connected to central rotatable discharge passage 29. However, various changes and additions, as illustrated in FIG. 6, are necessary to adapt the mechanism to satisfactorily meter and dispense liquids 24 as opposed to granular solids 1a.

The simple mechanism shown in FIGS. 2 and 4, for use with powdered or granular solids 1a, cannot be used for metering liquids 24, because the imperfect seal between the sector 31 and metering block 27 will not prevent liquids 24 from entering tubes 32 and 29 and rising in these tubes to the same height as the liquid 24 in the container 25. Hence, the volume of liquid 24 poured at any position would be the volume of the particular cavity covered by sector 31, plus that which was already in tube 29, plus additional leakage into the cavity during dispensing. This would cause an appreciable metering error. There may also be some difficulty in dispensing the liquid 24, due to the formation of a vacuum in the cavity, as the liquid is poured from it.

To correct these difficulties, passage 32 must be sealed at all times except when it is in position to empty one of the cavities. In addition, the top of each cavity must also be sealed from the liquid 24 in the container 25, when it is in position to be emptied so that additional liquid 24 cannot flow into the cavity while it is being emptied. Finally, a vent should be provided to allow the liquid to flow freely out of the particular cavity.

Referring to FIG. 6, it will be noted that a small valve 55 closes a port 52 at the entrance to passage 32. The valve is held closed by spring 56, and the valve stem is sealed from leakage by a resilient seal, such as an O-ring 58. However, as sector 31 turns to a position directly above one of the metering cavities, such as 33, the enlarged section of the valve stem engages cam 51, of item 50 and opens port 52 to passage 32. Prior to the opening of valve 55, however, the flat undersurface of sector 31, including port 52 passes over seal 53, which seals the volume around port 52 against entrance of liquid. Thus, when valve 55 opens, only that volume contained in cavity 33 can be poured out of the dispenser through passage 29.

To allow the measuring cavities 33, 34, 45 and 46 to pour out their contents freely, an air inlet vent is provided to admit air into the measuring cavity as its contents flow out through the outlet passage 29. To provide such an air vent, a cylindrical section 62 fitting closely against the bottom of metering block 27, is attached to the rotatable cylindrical section 36, which, in this embodiment, extends through the stationary meter block 27. The section 62 is rigidly held to shaft 36 by means of cap 69.

A cavity 63 is bored horizontally into section 62 and shaft 36. Cavity 63 is located in the vertical plane through discharge passage 32. A lever 64 extends into cavity 63. This lever pivots about a pin 66 attached to plug 67, which seals the end of cavity 63. Lever 64, which is biased upwardly by spring 68, in vertical bore 70 carries a resilient seal 65 of a material, as, for example, rubber, which seals a small hole 60a extending from cavity 63 to the upper side of plate 62. A similar hole 60 extending from the bottom of metering cavity 33, through block 27, lines up with hole 60a when the rotatable sector 31 is in a position to empty the cavity. The holes 60 are surrounded by resilient seals 61, which seal the surface between plate 62 and meter block 27.

Rotatable member 28, which in FIG. 2 has a single discharge passage 29, has, in the embodiment of FIG. 6, two passages 29 and 29a. Passage 29 serves to discharge the contents of the metering cavities. Passage 29a which parallels passage 29, and extends through cylindrical section 36 from cavity 63 to a point externally of the dispenser device, contains a small captive operating rod 71. When the dispenser is inverted, and in a position to discharge the contents of one of the metering cavities, such as 33, operating rod 71, may be depressed by the user of the device, moving lever 64, and with its seal 65 against biasing spring 68, opening passages 60, 60a to cavity 63, and thence to atmosphere via venting tube 29a. The liquid contents 24 of cavity 33 will now discharge freely through outlet passage 29.

Figure 7:
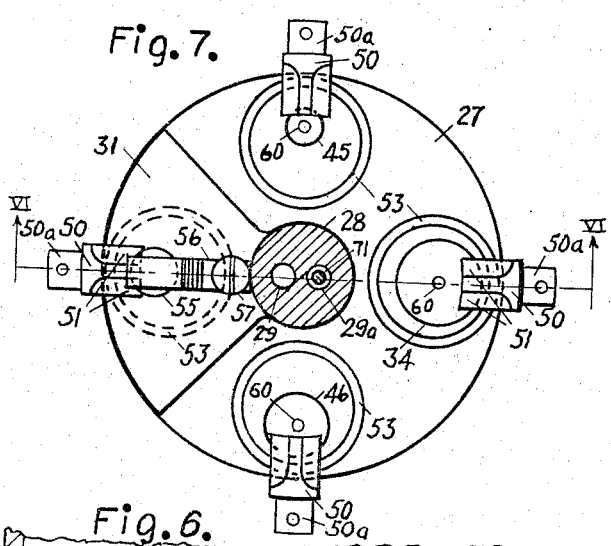
FIG. 7 shows a horizontal section of FIG. 6, taken along line VII—VII thereof.

FIG. 7, which is a sectional view of FIG. 6 taken along the line VII—VII thereof, further illustrates this construction, showing the location of additional measuring cavities 45 and 46. At the position of each cavity, there is a valve control member 50 with valve opening cam 51. Surrounding each measuring cavity, there is also a resilient seal 53.

FIGS. 8, 9, 10 and 11 illustrate another embodiment of this invention, adapted for dispensing relatively larger quantities of material than the devices described in FIGURES 1 to 7. For these larger quantities, it is not convenient to bodily invert the dispenser, as may readily be done for smaller devices. Hence, the metered materials are removed from the dispensing chamber through a valve, rather than by inversion of the chamber.

Referring to FIG. 8, which is a vertical section through this embodiment of the invention, the reference numeral 80 designates the dispensing chamber, having a cover 100, which houses the material 1a to be dispensed, and the metering and dispensing mechanism. Chamber 80 is mounted on base 81, which has a vertical support post 82, whose upper end forms a bearing shaft extending into the bearing 83, located on the vertical axis of chamber 80 near its lower end. The dispensing chamber 80 is thus rotatably supported by support post 82.

Near the lower end of chamber 80, spaced circumferentially around its axis, are a number of metering cavities, 84, 85, 86, 87 (see also FIG. 9), which are normally filled by gravity with the contents 1a of the chamber 80. As the dispensing chamber is rotated, these cavities successively come under a sector-shaped plate 88, which is rigidly attached to the top of stationary support post 82. The sector-shaped plate 88 may be secured by means of a mounting bolt 104 to the top of stationary support post 82. A spring-biased locating pin 89 locates the metering cavity at the central position, under stationary plate 88. In this position, the rod 90, which is mounted on pedestal 101, and biased to the right by spring 99, engages, when pushed toward the left, with the valve plate 91 of valve 92, and moves it to the "valve open" position. The metered contents 1a of the cavity 84 will now flow by gravity through valve port 94 into a container 93, but additional material 1a from the dispenser chamber 80 is prevented from emerging by the stationary cover plate 88 above the cavity. However, as chamber 80 is rotated to place another cavity under the plate 88 its contents can immediately be discharged. Simultaneously, as a second cavity is moved under plate 88, the first cavity emerging from under plate 88, is immediately refilled by material 1a, and is ready to again be discharged into container 93.

In order to provide for a continuous flow, when this is desired, another valve release rod 90a (FIG. 8A) on a pedestal 102 may be provided opposite rod 90, as shown more clearly in FIG. 8A, described hereinafter. Rod 90A operates on a cavity, that is not covered by plate 88, and hence material 1a will flow continuously from the dispenser device when rod 90a is depressed.

FIGS. 8A, 9A, 10A and 11A show a variation of the dispenser of FIGS. 8–11 adapted for dispensing a liquid 24. For use with liquids 24, resilient seals 96, such as O-rings, are placed around the top of each of the measuring cavities 84, 85, 86 and 87. When the stationary selective sector 88 covers one of the measuring cavities, the seal 96 closes tightly the space between the top of the respective cavity and plate 88, so that additional liquid 24 cannot flow into the cavity while its contents are being discharged. Another resilient seal 97, between the bearing 83 and stationary support shaft 82 prevents liquid leakage here, and still another similar seal 107, is provided in valve 92, sealing between the valve body and valve plate 91 to prevent leakage at this point. A vent tube 103 extends from sector-shaped plate 88 to a point above the liquid contents 24 in dispensing chamber 80. This allows air to flow into the particular measuring cavity to replace the liquid discharged therefrom. This prevents the formation of a vacuum, and allows the liquid 24 to flow out freely. The volume of tube 103 is so small that any liquid trapped in it causes negligible error in the volume discharged from the metering cavity. For certain liquids, the venting tube 103 may be eliminated altogether.

In some applications it may be desirable to mount the dispenser chamber 80 in a stationary position. This may be done by supporting the dispenser from a stationary support such as 109 illustrated in FIG. 8B. Pins 108 of the supporting arms 109 engage with lugs 95 of chamber 80, freely suspending the chamber and the base portion 81. The base 81, which carries the locating pin 89, release rods 90 and 90a and the plate 88 is now rotatably supported from chamber 80 by post 82. The operation of the dispenser is the same as described above for the dispenser resting on base 81, except that the release mechanism now rotates and the dispensing chamber 80 is stationary.

A horizontal section of the dispenser chamber 80 taken along line IX–A—IX–A of FIG. 8A, is shown in FIG. 9A. This view shows more clearly the form and location of the metering cavities 84, 85, 86, 87, seals 96, vent tube 103 and the sector-shaped cover plate 88.

Enlarged views of the valves 92, employed to discharge the contents of each of the metering cavities are shown in FIGS. 10A and 11A. The movable valve member 91 consists of a flat bar, fitted into a valve body 92 in which it is slidably mounted. It is normally biased by a compression spring 98 to a closed position. The valve member 91 has a transverse dispensing hole 105 provided therein, which, when the valve plate 91 is pushed toward the left to its extreme position, is axially aligned with the outlet passage 106 in valve body 92, thereby permitting the contents 24 of the metering cavity to flow by gravity into container 93.

Figure 12:
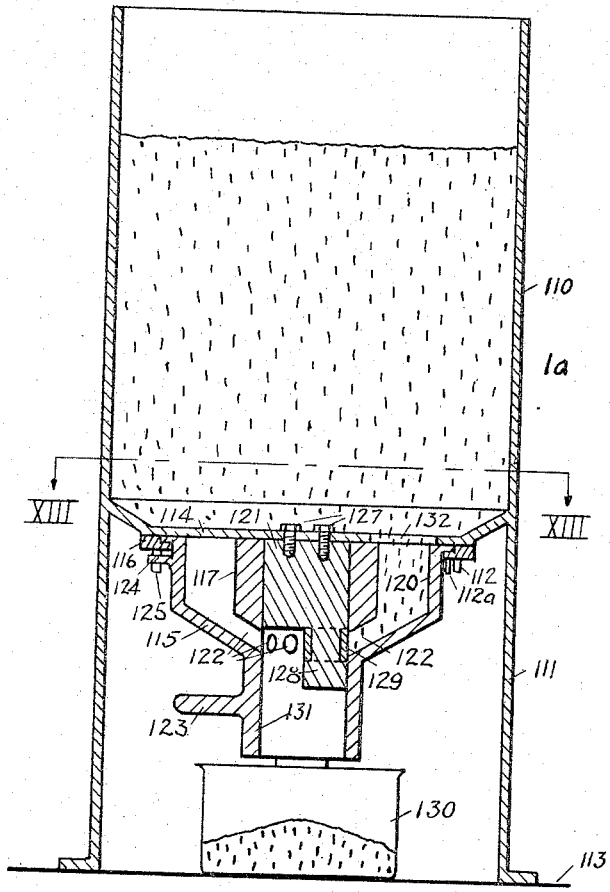
FIG. 12 is a horizontal section of another embodiment of this invention, taken essentially along line XII—XII of FIG. 13, but with the rotatable block section shown along lines XIIA—XIIA of FIG. 13; and, FIG. 13 is a vertical section of the dispenser shown in FIG. 12, taken essentially along line XIII—XIII.
Figure 13:
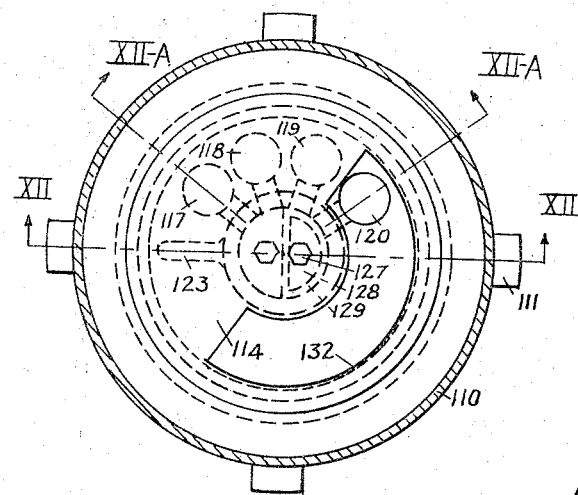

FIGS. 12 and 13 show another embodiment of this invention suitable for dispensing materials in relatively large quantities. Referring to FIG. 12, which is a vertical section taken through this embodiment of the invention, the reference numeral 110 designates a stationary chamber that houses the material 1a to be dispensed. Chamber 110 is supported by supporting legs 111 on a suitable base 113. The bottom of chamber 110, which is designated by numeral 114, supports the metering and dispensing mechanism. The underside of bottom 114 has a flat surface against which the mechanism is mounted.

A flanged ring 116, rigidly attached to plate 114, supports a rotatable metering element 115. Element 115 contains the metering cavities 117, 118, 119, and 120 (see also FIG. 13). A cylindrical shaft 121, with semi-circular blocking extension 128, is rigidly attached by suitable means, such as bolts 127, to the center of lower plate 114. Shaft 121 fits closely in the central bore 131 of the metering element 115, which is rotatable about it.

The metering cavities, of which there are in this example four of equal size, are located circumferentially around the element 115, occupying approximately ⅘ of 180 or 144 degrees. In any case these cavities would occupy somewhat less than 180 degrees of the circumference of element 115. For N cavities of equal size, the angle occupied would be approximately $$\frac{N-1}{N} \times 180 \text{ degrees}$$

It is generally desirable but not necessary to have all the cavities of equal size.

The metering element 115 fits closely against the bottom plate 114. Plate 114 has a semi-circular cutout section 132, extending approximately 180 degrees around its vertical axis. Section 132 is located so that as meter element 115 rotates, the metering cavities 117–120 will pass under opening 132, and in doing so the cavities will be filled by gravity from the contents of chamber 110. Each of the cavities has a discharge passage 122, which opens into the central discharge bore 131 of element 115. However, element 115 has a lug 124 engaging stop 125 which allows it to rotate clockwise (as seen in FIG. 13) only $$\frac{N-1}{N} \times 180 \text{ degrees}$$

after the first cavity emerges from under the solid portion of plate 114, into the open section 132. This permits all the metering cavities to be filled but does not allow them to come back the full 180 degrees of opening 132. The semi-circular extension 128 of shaft 121 is located so that it will close the openings 122 of these cavities under opening 132, preventing them from discharging their contents.

Extension 128 is covered by a resilient seal 129 on the section opposite openings 122. Extension 128 is located in a position to also cover the opening 122 of the first cavity counterclockwise (as seen in FIG. 13) beyond the end of opening 132. This prevents any discharge from this cavity while it is still in a position where material from the chamber 110 can enter it. As the element 115 is rotated counterclockwise, each cavity, after it has passed under the solid bottom of plate 114 through an angle occupied by one cavity, will begin to discharge its contents into bore 131, and thence into container 130. Thus any desired number of the metering cavities may be discharged into container 130. A stop 112 engages lug 124 on element 115, after it has rotated counterclockwise until all metering cavities have been discharged. All of the cavities are still under the solid portion of plate 114. However stop 112 may be bypassed to stop 112a, located $$\frac{180}{N+1}$$

degrees beyond stop 112 so that by the further counter-clockwise rotation cavity 117 emerges beneath opening 132. The top of this cavity is now open to the contents of chamber 110, and its outlet 122 is not sealed by extension 128. This permits a continuous flow of material in this position.

To refill the metering cavities, the metering element 115 is rotated in a clockwise direction by means of handle 123 until lug 124 engages stop 125. The operation may then be repeated.

Although I have shown and described specific structures, it is to be clearly understood that the same were merely for the purpose of illustration, and that changes and modifications may readily be made therein by those skilled in the art, without departing from the spirit and scope of the invention.

I claim as my invention:

1. A manually-operated metering dispenser adapted for dispensing liquids comprising a rotatable dispensing chamber housing the liquids to be dispensed and a metering section disposed near the bottom of said dispenser chamber and forming a part thereof, said metering section containing a number of separate metering cavities of specific volume disposed so as to be normally filled by gravity with the liquid in the dispenser chamber, means mounting the dispenser chamber and metering section so as to be manually rotatable about its vertical axis, means defining a lowered-disposed discharge outlet on each of the metering cavities, means providing a separate valve normally closing each discharge passage and individual thereto, a stationary sector-shaped cover plate which covers successively each of the metering cavities as the dispenser chamber is rotated, sealing means between the sector-cover plate and the surface around each metering cavity in the discharge position, sealing means on the discharge valve and support bearing venting means to admit air to the cavity being discharged, and a lower-disposed valve-release mechanism located so as to release the valve on the covered cavity thereby permitting its contents to flow freely from the cavity by gravity.

2. A manually-operated invertible hand metering dispenser suitable for dispensing liquids comprising a dispensing chamber housing the liquid to be dispensed and a dispensing mechanism, said mechanism including a metering section disposed within and near the bottom of said dispenser chamber and forming a part thereof, said section including several metering cavities disposed around its periphery so as to be filled by gravity, each of a specific volume, vertically-disposed selecting means defining a discharge passage rotatably movable relative to said section extending from the metering section upwardly to a point externally of the dispenser and having an upper open end in the normal upright at rest position of the dispenser, said dispenser passage having at its lower end a sector-shaped portion (31) which when moved relative to the cavities forms successively a cover over each of the metering cavities, means defining a connecting passage from the underside of the sector to the main discharge passage (29), a valve (55) normally closed at the entrance to the connecting passage, means for opening this valve only when the discharge sector (29) is directly above a selected metering cavity to prevent additional fluid flow into the cavity when in position to be discharged, thereby permitting the metered volume to be poured from the dispenser when the dispenser is inverted.

3. A hand-type metering dispenser comprising a material container, a flowable material to be dispensed and a dispensing mechanism, said mechanism comprising a multiplicity of rotatable metering cavities disposed at the bottom of said container when in its normal upright position refillable from the material in the dispenser chamber by gravity, vertically disposed rotatable selecting means having an indicator to effect rotation of said metering cavities, said selecting means defining a discharge passage open at its upper end in the normal upright at rest position of the device, each cavity having a specific volume and its individual filling opening, means including a stationary plate (6) having a circular slot (44) adapted to at times to register with the filling openings of a plurality of said metering cavities, said selecting means selectng one or more of these volumes to be simultaneously discharged through said discharge passage, and means for passing the discharged material in said selected volumes through said discharge passage to a location externally of the dispenser by hand inversion of said material container.

4. A hand-type metering dispenser comprising an invertible container housing a flowable material to be dispensed and a dispensing mechanism comprising a rotatable metering section (12) disposed interiorly and near the bottom of said invertible dispenser container, means defining a plurality of rotatable metering cavities of specific volumes disposed around the periphery of said rotatable metering section (12) each having its individual filling and discharge openings, said metering cavities being so disposed vertically as to be normally filled by gravity with the flowable material within the dispenser container when in its normal upright position through a stationary valve plate (6) having a circular slot (44) therein, said stationary valve plate being relatively movable with respect to said individual filling openings, vertically-disposed rotatable selecting means (14) having an indicator defining a discharge passage with an upper open end in the normal upright at rest position of the dispenser extending from the rotatable metering section (12) to a point externally of the dispenser chamber, said selecting means (14) rotating said metering section (12) and successively selecting and connecting with a single dial setting (20) the selected individual discharge pasages (13) to simultaneously discharge any selected number of the metering cavities to a location, externally of the dispenser upon hand inversion of the dispenser container.

5. The hand-type metering dispenser of claim 4, wherein a stationary valve (17) closes off the discharge passages (13) of the opened filling openings of the unselected metering cavities from the discharge passage provided by the vertically-disposed rotatable selecting means (14).

6. A hand-type metering dispenser comprising a normally upright dispenser container having a flowable material to be dispensed, a dispensing mechanism comprising a stationary metering section disposed interiorly and near the bottom of said dispenser container, said metering section comprising a number of individual metering cavities of specific volumes disposed vertically so as to be normally filled by gravity with the flowable material in the dispenser container when in its normal upright position, vertically disposed rotatable selecting means defining a rotatable main discharge passage (29) extending from the metering section upwardly to a point externally of the dispenser and having an upper open end in the normal upright at rest position of the dispenser, said vertically-disposed rotatable selecting means having at its lower end a laterally-projecting sector-shaped portion (31) which when selectively rotated forms successively a cover over each of the metering cavities, a connecting passage (32) leading from the under-side of the sector-shaped portion to the main discharge passage (29) permitting the flowable material in the selected covered cavity to be poured into the main discharge passage (29) and thence externally of the dispenser when the dispenser is inverted, and indicator means rotatable with said selecting means involving a single setting for positioning the connecting passage (32) to discharge a selected volum of flowable material.

7. A manually-operated metering dispenser having a dispenser chamber containing a flowable material to be dispensed and having a metering section disposed near the bottom of the dispenser chamber, said metering section containing a number of metering cavities of specific volumes disposed so as to be normally filled by gravity with the flowable material disposed within the dispenser chamber, indicator means on the dispenser chamber, each metering cavity having an upper filling opening and a lower discharge opening, each lower discharge opening having a lower valve individual thereto normally closing the discharge opening, a sector-shaped valve cover plate (88) relatively movable with respect to said dispenser chamber and metering section, said valve cover plate successively covering the upper filling opening of each metering cavity, manually-selecting means determining a relative positioning of said sector-shaped valve cover plate (88) with respect to a particular metering cavity, and a lower valve release mechanism to release the lower valve on the selected covered cavity thereby permitting its contents to flow downwardly out of the lower discharge opening by gravity.

8. The manually-operated metering dispenser of claim 7, wherein means supports the dispenser chamber in a fixed stationary position, and means rotatably supports the valve release mechanism and sector-shaped valve cover plate (88) relative thereto.

9. A hand-operated metering dispenser comprising a stationary material storage chamber and an associated lower external dispensing mechanism relatively movable thereto, said mechanism comprising a metering section containing a multiplicity of lower-disposed metering cavities of definite volumes disposed so as to be normally filled by gravity form the flowable material in the chamber and a lower rotatable tubular discharge portion, means defining a lower-disposed discharge passage (122) from each metering cavity into said lower rotatable tubular discharge portion, manually-operated selective means for selectively rotating the metering section and lower tubular discharge portion to a position bringing the cavities in succession under an elongated circular slot provided in a stationary lower valve plate (114) of the stationary storage chamber for filling of the cavities in succession, and simultaneously closing the discharge passages (122) from the cavities, said selective means adapted for selective reverse rotation of the rotatable metering section to bring any number of the filled cavities under the closed portion of the valve plate preventing further entrance of material by gravity into the covered cavities and simultaneously opening their discharge passages (122) permitting the material in the covered cavities to be simultaneously dispensed by gravity.

References Cited
UNITED STATES PATENTS

| | | |
|---|---|---|
| 1,049,301 | 12/1912 | Heyman. |
| 1,914,766 | 6/1933 | Zoloschan _____ 222—452 |
| 1,943,199 | 1/1934 | Asplund _____ 222—367 |
| 2,489,171 | 11/1949 | Balduf _____ 222— 486 X |
| 2,515,735 | 7/1950 | Saunders _____ 222—430 X |
| 2,579,388 | 12/1951 | Lowry _____ 222—362 |
| 3,130,874 | 4/1964 | Blumer _____ 222—443 X |

ROBERT B. REEVES, *Primary Examiner.*

N. L. STACK, *Assistant Examiner.*